United States Patent

[11] 3,540,765

| [72] | Inventor | Robert G. Brown |
| | | Washington, District of Columbia |
| [21] | Appl. No. | 778,563 |
| [22] | Filed | Nov. 25, 1968 |
| [45] | Patented | Nov. 17, 1970 |
| [73] | Assignee | B. H. Bunn Company |
| | | Chicago, Illinois |
| | | a corporation of Illinois |

[54] INTERMITTENT DRIVE FOR TYING MACHINE TWINE ARM
7 Claims, 5 Drawing Figs.

| [52] | U.S. Cl. | 289/15 |
| [51] | Int. Cl. | B65h 69/04 |
| [50] | Field of Search | 289/15 |

[56] References Cited
UNITED STATES PATENTS

| 933,126 | 9/1909 | Sharp | 289/15 |
| 3,248,139 | 4/1966 | Bledsoe | 289/15 |

Primary Examiner—Louis K. Rimrodt
Attorney—Davis, Lucas, Brewer and Brugman

ABSTRACT: The invention resides in a cam-type intermittent drive for the twine arm of a twine tying machine which results in a smoother and faster tying operation, eliminates the twine arm brake and produces a tighter wrap. The drive utilizes two cams which simultaneously engage rollers extending from the opposite sides of a wheel and which control the rotation of the wheel in both directions, the cams having a dwell portion during which the twine arm is held stationary while the knotter is operated. The wheel drives the twine arm through appropriate gearing.

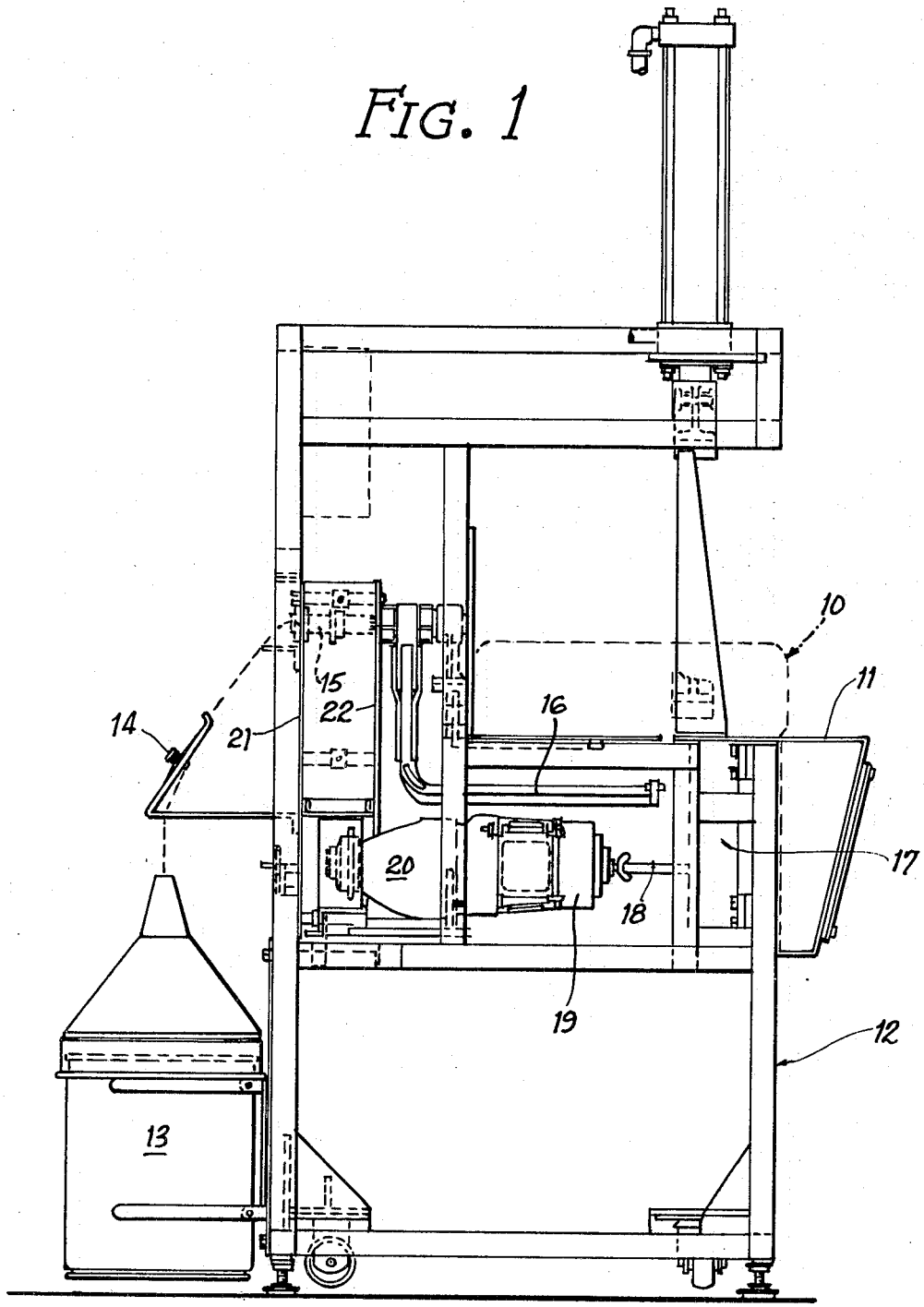

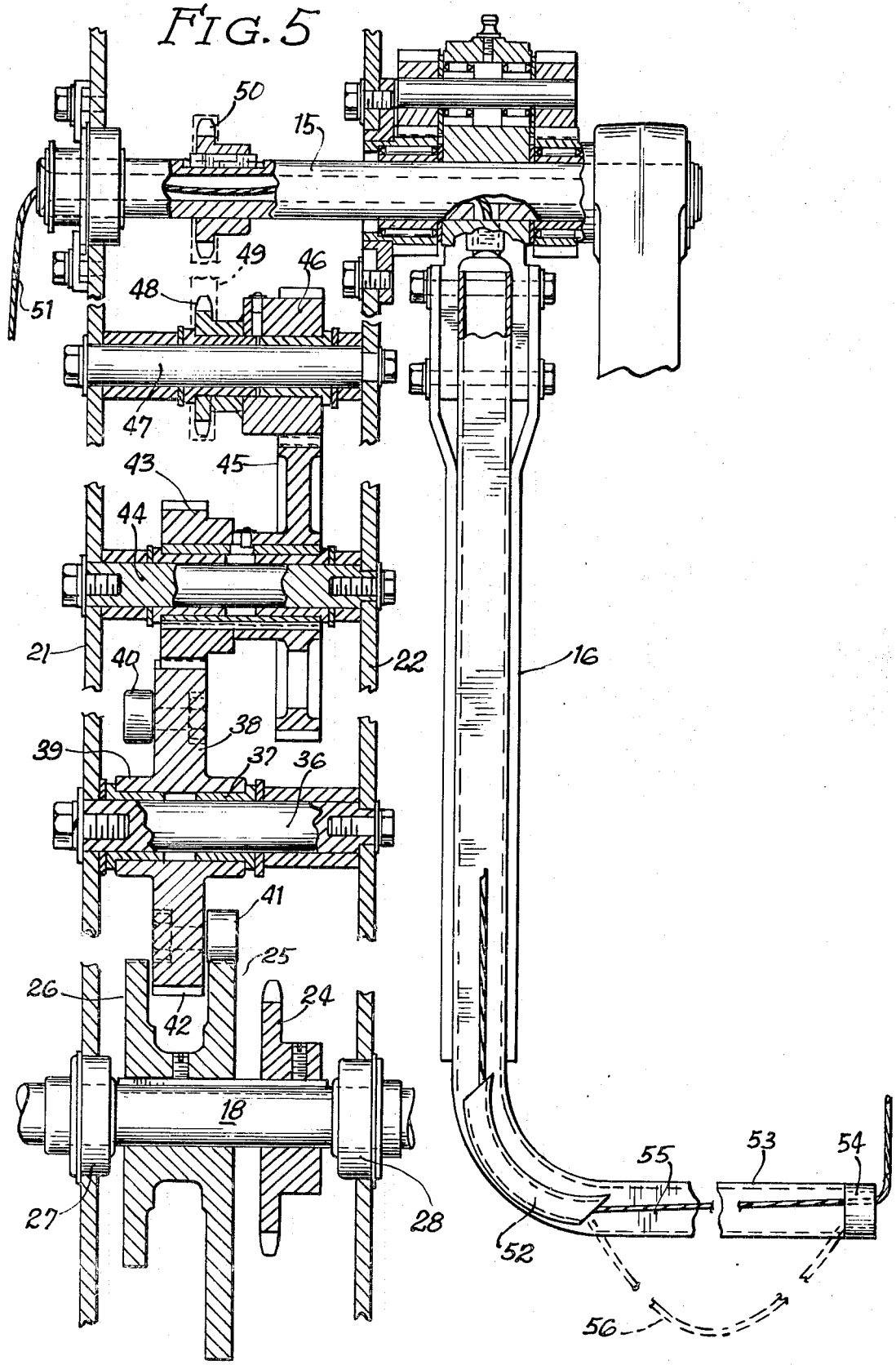

INTERMITTENT DRIVE FOR TYING MACHINE TWINE ARM

This invention relates to driving mechanisms for tying machine twine arms.

In the normal functioning of a twine tying machine, a bundle to be tied is held on the table of the machine while a reach of twine is wrapped around the bundle by a rotating twine arm. At the end of the wrapping operation, a knotter mechanism is activated to tie a knot in the twine and sever it from the twine supply. To reduce the cost of tying each bundle, it is desirable that the rotation of the twine arm be as rapid as possible.

Heretofore, the drive used for the twine arm comprised an interrupted gear which engaged a pinion connected to the twine arm. Obviously, the engagement was sudden, and the twine arm was accelerated almost instantly from rest to maximum speed of rotation, thereby imposing a shock load on the driving mechanism which limited the speed at which the twine arm could be rotated. Furthermore, during the interval in which the arm is not driven by the interrupted gear, said arm is free to rotate, and since such free rotation is undesirable, a friction brake is normally provided for the arm.

It is an object of this invention to provide an intermittent drive for the twine arm of a twine tying machine wherein the arm will be driven at several times the normal speed, with smoother acceleration and deceleration.

As another object, this invention seeks to provide an intermittent drive for the twine arm of a twine tying machine wherein the twine arm is positively held against rotation by said drive while the twine knotting function takes place.

These and other objects of this invention will become apparent from the following detailed description of a preferred embodiment thereof when taken together with the accompanying drawings in which:

FIG. 1 is a side elevational view of a tying machine incorporating this invention;

FIG. 5 is a still further enlarged side elevational view, in section, of the twine arm drive mechanism, the section being taken along line 5-5 of FIG. 4.

Figure 3:
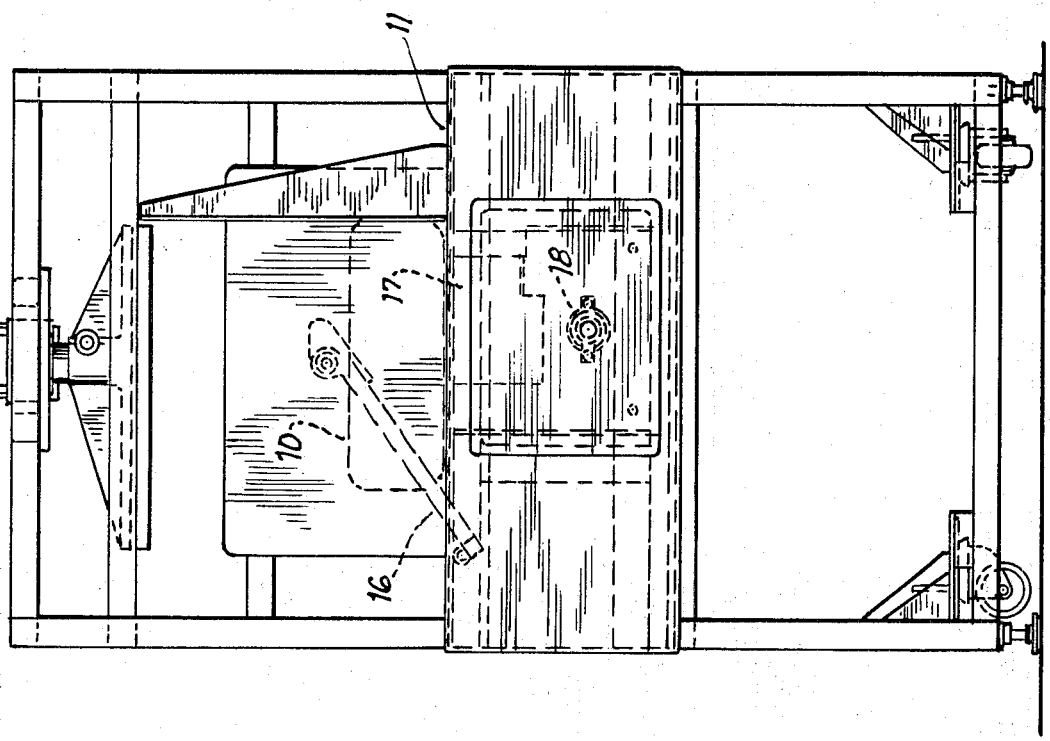
FIGS. 2 and 3 are respectively rear and front elevational views of the machine of FIG. 1.
Figure 2:
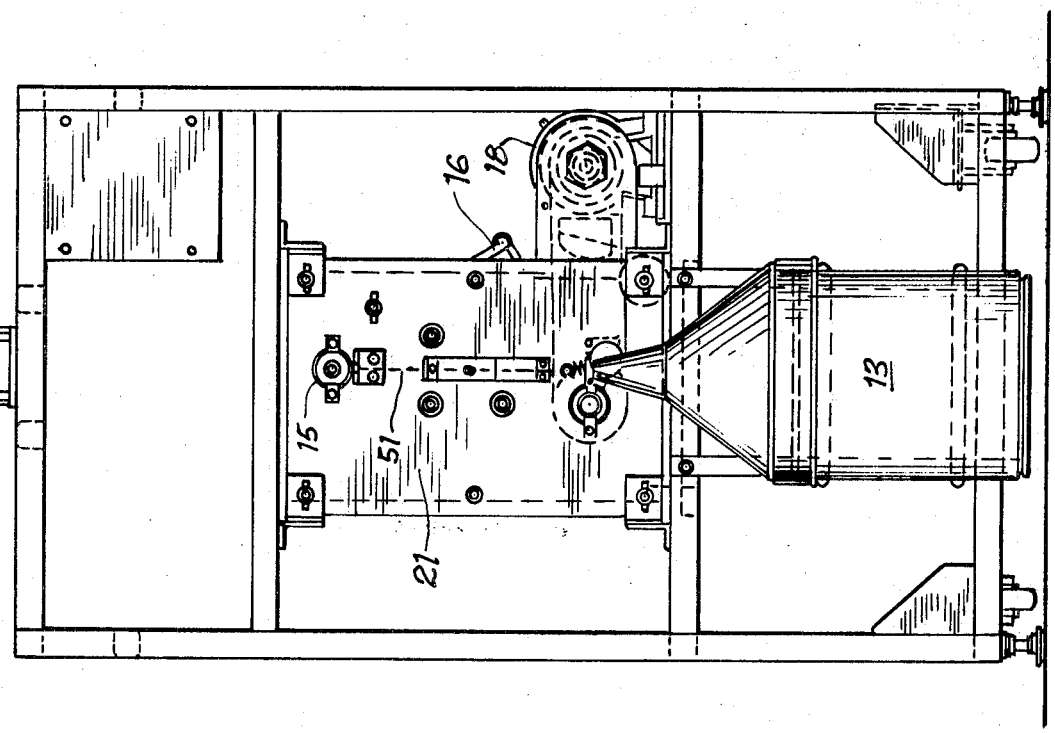

In the form selected to illustrate this invention, the twine arm drive includes a pair of plate cams, mounted on the same drive shaft and arranged to contact two sets of roller followers mounted on opposite sides of a driven wheel, each cam driving one set of rollers. The wheel is connected through appropriate gearing to the twine arm. The cams are so shaped that both contact their respective rollers at all times so that the driven wheel is locked between the cams and cannot rotate in either direction except as dictated by the curvature of the cams. The shape of the cams determines the acceleration and deceleration of the driven wheel, and a dwell portion on the cams holds the wheel against rotation, thus serving as a brake for the twine arm. While the cams are on their dwell portions, however, the knotter of the tying machine is operated.

Referring now to the drawings for a detailed description of the invention and particularly to FIG. 1, there is shown a tying machine for tying twine around a relatively large bundle 10 of magazines, newspapers, or the like. The bundle 10 is placed upon a table 11, supported on a frame 12 of generally rectangular form. Twine for the tying operation is applied from a twine cone (not shown) supported in a container 13 appropriately mounted on the rear of the frame 12. The twine passes outward through a twine tensioner 14 to a hollow shaft 15 on which is mounted the twine arms 16 and by which said twine arm is rotated around the bundle 10. The end of the twine is held by a knotter mechanism shown as a rectangle 17 disposed under table 11, said knotter mechanism tying the two ends of the wrapped twine together near one corner of the bundle 10.

The details of the knotter mechanism do not form a part of this invention and accordingly are not shown here in detail. The knotter mechanism, however, may take the form disclosed in B. H. Bunn U.S. Pat. No. 1,606,290 dated Nov. 9, 1926. Suffice it to say that said knotter mechanism 17 is driven by a shaft 18 from a motor 19 through means hereinafter to be described. Said motor 19 also drives the twine arm and, in the form chosen to illustrate this invention, the motor is operated only when a tying operation is to be performed, and hence stops after each tying operation. A built-in brake shown in outline at 20 stops the drive mechanism immediately upon the completion of a tying operation.

The drive mechanism of this invention is secured between two mounting plates 21 and 22, disposed vertically and in spaced relation to one another at the rear of frame 12. The drive mechanism is shown in detail in FIGS. 4 and 5, to which reference is now made.

Motor 19 drives a roller chain 23, which, in turn, drives a sprocket 24 keyed to shaft 18. Also keyed to shaft 18 is a pair of plate cams 25, 26 which, for ease of manufacture, may be made as a single casting. Shaft 18 is supported in plates 21 and 22 by antifriction bearings 27 and 28.

Plate cams 25 and 26 are identical in contour and each comprises a dwell portion 29, a depressed portion 30, a rise 31, a fall portion 32, which, at its bottom, forms a second depressed portion 33 of substantially the same contour as depressed portion 30, and of substantially equal depth thereto; a second rise portion 34, and a fall portion 35 which terminates at the dwell 29. Said cams 25 and 26, however, are so disposed angularly with respect to one another that a depressed portion 30 of one cam coincides with the peak of the rise portion of the other cam.

Disposed vertically above shaft 18 is a countershaft 36 appropriately secured to plates 21 and 22. On countershaft 36 is a sleeve 37 on which is rotatably mounted a wheel 38 provided with a relatively wide hub 39 to absorb eccentric thrusts upon wheel 38. Secured to each side of wheel 38 and at identical radial distances from the center of countershaft 36 are roller followers 40 and 41, said followers being substantially identical in size and, in the form chosen to illustrate this invention, disposed four on one side and four on the other side of said wheel 38. Roller followers 40 cooperate with cam 26 and roller followers 41 cooperate with cam 25.

Figure 4:
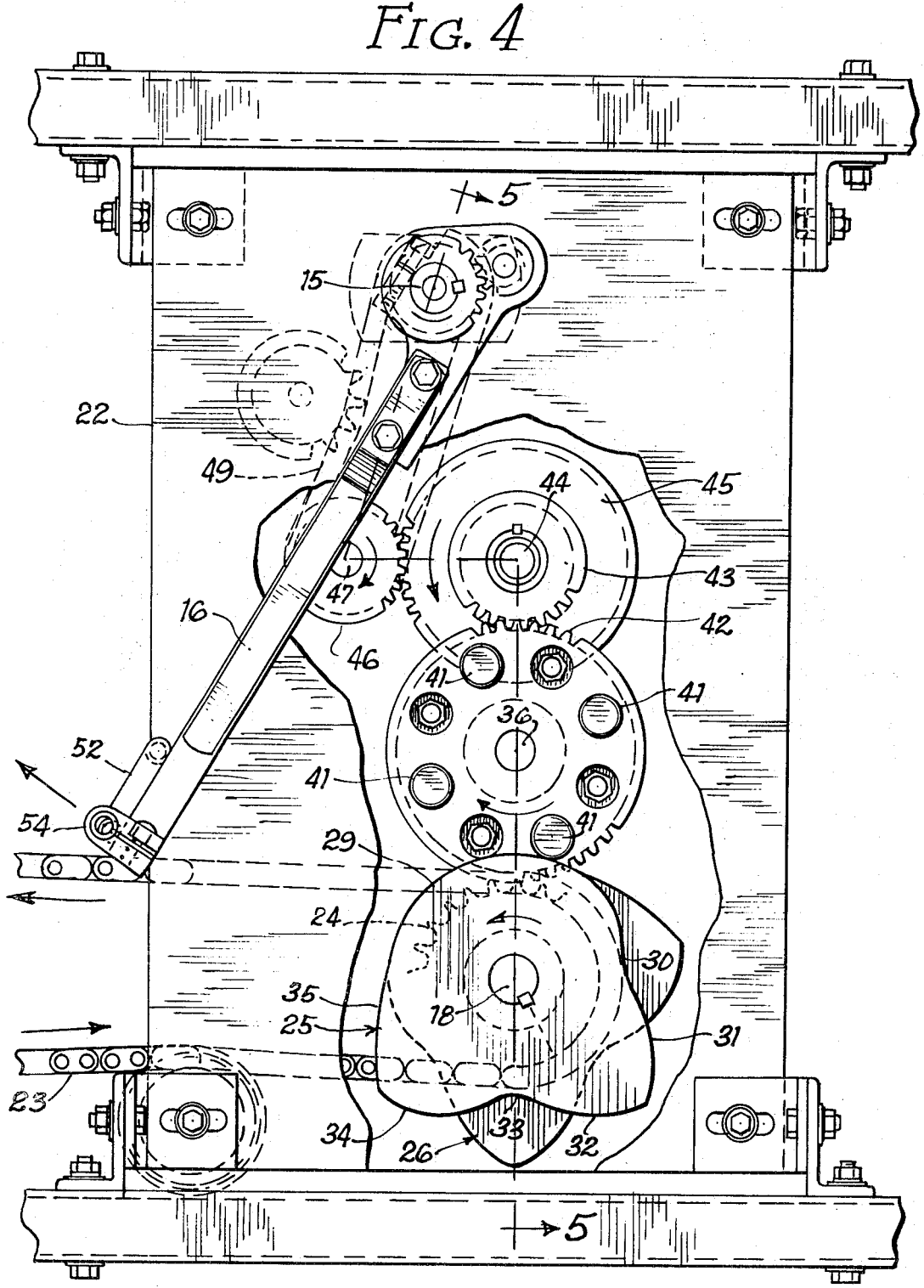
FIG. 4 is an enlarged fragmentary front elevational view of the machine of FIG. 1 with a portion of the cover cut away to expose the novel drive mechanism.

It may be observed from FIG. 4 that as the rise of one cam cooperates with its roller follower, the depressed portion of the other cam cooperates with its roller follower, so that between the two cams the roller followers rigidly hold wheel 18 against uncontrolled rotation by the cams, and hence wheel 18 is constrained to rotate in accordance with the dictates of the contours of said cams. As a rise such as 31 engages a roller follower, the wheel 38 is rotated and is constrained against rotating in the opposite direction by the adjacent cam.

When the dwell portions 29 of both cams operate simultaneously on their respective roller followers, no rotary motion is transmitted to wheel 38, and said wheel is, in fact, locked against rotation in either direction by the presence of the dwell portions 29, which, in effect, extend radially inward between angularly adjacent roller followers. The net result, therefore, is an intermittent drive of wheel 38, with the acceleration and deceleration thereof controlled by the shapes of the rises 31 and falls 32 of the cams 25 and 26.

The intermittent drive is utilized to drive twine arm 16 for a portion of a revolution of shaft 18 and then to hold said arm against rotation while shaft 18 drives the knotter to complete the tying cycle. Thus the periphery of wheel 38 is provided with gear teeth 42 which mesh with a pinion 43 mounted for rotation on a second countershaft 44 appropriately supported between plates 21 and 22. Keyed to pinion 43 is a gear 45 which meshes with a pinion 46 mounted for rotation on a third countershaft 47, also appropriately secured to plates 21 and 22. Pinion 46 has welded or otherwise secured thereto a sprocket 48 which is connected by a chain 49 to a sprocket 50 keyed to hollow shaft 15 which, as described above, drives the twine arm 16.

The speed of rotation of twine arm 16, as well as the degree of rotation, depends on the relative numbers of teeth on the gears and sprockets intermediate wheel 38 and shaft 15. It is desired, of course, that twine arm 16 make at least one complete revolution per cycle so as to wrap a reach of twine completely around an article 10. Thus the relative numbers of teeth is so selected as to cause shaft 15 to make one complete revolution while wheel 38 moves through the angular distance between adjacent rollers on one side. If, however, it should be desired to wrap the twine around the article twice per cycle, then the numbers of teeth on the gears, pinions and sprockets between wheel 38 and shaft 15 would be so selected as to produce two revolutions of shaft 15 for each angular movement of wheel 38 from one roller follower 40 on one side to the adjacent roller follower on that side.

It has been found that the use of the cam and follower drive of this invention in place of the interrupted gear drive used on prior tying machines resulted in a four times faster rotation of twine arm 16 without undue shock to said arm. This resulted in a four times faster tying cycle, and hence materially reduced the cost of tying a bundle. The cam and follower mechanism of this invention also eliminates the need for a brake on the twine arm, as was required in the interrupted gear type of drive. This is made possible by the fact that the dwell portions 29 of the cams, when cooperating with their respective rollers 40 and 41 effectively hold the wheel 38 against rotation in either direction, and since wheel 38 is so held, arm 16 is likewise held against rotation. Furthermore, the arm 16 is always held at the same angular position relative to table 11 and bundle 10, so that each tying cycle commences and ends at precisely the same predetermined spot.

It may be noted from FIG. 5 that twine 51 passes through the hollow shaft 15, emerges on the exterior of arm 16, passes through a 90° guide tube 52, and then along horizontal portion 53 of the twine arm through the guide 54 at the end of horizontal portion 53. From guide 54 the twine passes to the knotter mechanism, as previously described. The horizontal portion 55 of the twine between guides 52 and 54 is substantially unsupported and therefore as the twine arm is rotated said portion 55 is subjected to centrifugal force, as shown in dotted lines at 56. The four-times increase in the speed of rotation of arm 16 has been found to increase the centrifugal force acting upon the section 55 to such an extent that said section acts as a takeup for slack in the twine going to the knotter, so that as the twine is wrapped around an article, all looseness in the twine is eliminated and a tighter wrap is obtained.

Thus the use of the cams and followers of the foregoing design results in a much faster tying cycle with less shock to the twine arm, eliminates the twine arm brake and produces a tighter and hence more satisfactory wrap. The faster operation and the braking and holding action are also available in other twine handling devices, such as the knotter, when they are driven by the foregoing cam and follower device. It is understood, therefore, that this invention is not to be limited in scope to the foregoing description, but is to be determined by the appended claims.

I claim:

1. In a twine tying machine, a knotter mechanism, means for operating said mechanism, a rotatable twine conducting device, a rotatable support for said device, a motor for driving said device, and means for transmitting an intermittent drive from said motor to said rotatable support, said means comprising a shaft, a pair of axially spaced plate cams mounted on said shaft for rotation therewith, means for driving said shaft from said motor, a countershaft, a drive-transmitting wheel on said countershaft and extending between said spaced cams, roller followers secured to the sides of said wheel and adapted to cooperate with said cams to be driven thereby, and means connecting said wheel to said rotatable support for driving said rotatable support from said wheel, said cams having sectors of constant radius adapted at times to engage simultaneously two adjacent rollers, whereby to hold said wheel against rotation while the cams are rotating and thereby to hold the twine conducting device against rotation while the knotter mechanism is operating.

2. The combination defined in claim 1, wherein said twine conducting device comprises a twine arm for wrapping a reach of twine about an article.

3. The combination defined in claim 1, said wheel having a toothed periphery, and said means for transmitting an intermittent drive comprising further positive drive means connecting the toothed wheel to said rotatable support.

4. The combination defined in claim 1, other twine conducting means on said tying machine, said shaft being connected to drive said other twine conducting means.

5. The combination defined in claim 1, said cams having such relation to said followers that each cam has a dwell portion, a rise above the dwell portion and a reentry portion below the dwell portion, the rise of one cam being coincident with the reentry of the other cam to control the rotation of the wheel in both directions at all times.

6. The combination defined in claim 1, wherein said twine conducting device comprises a twine arm for wrapping a reach of twine about an article and said means connecting said wheel to said rotatable support comprising a positive drive means, whereby said twine arm is held against rotation by said wheel when the sectors of constant radius of the cams engage adjacent rollers simultaneously.

7. The combination defined in claim 1, said shaft being connected to drive said knotter mechanism, said twine conducting device comprising a twine arm for wrapping a reach of twine about an article, said means connecting said wheel to said rotatable support comprising a positive drive means, whereby said twine arm is held against rotation by said wheel when the sectors of constant radius of the cams engage adjacent rollers simultaneously.